Aug. 12, 1930.  J. S. OGSBURY  1,772,464
COMPUTING SCALE
Filed Sept. 26, 1925
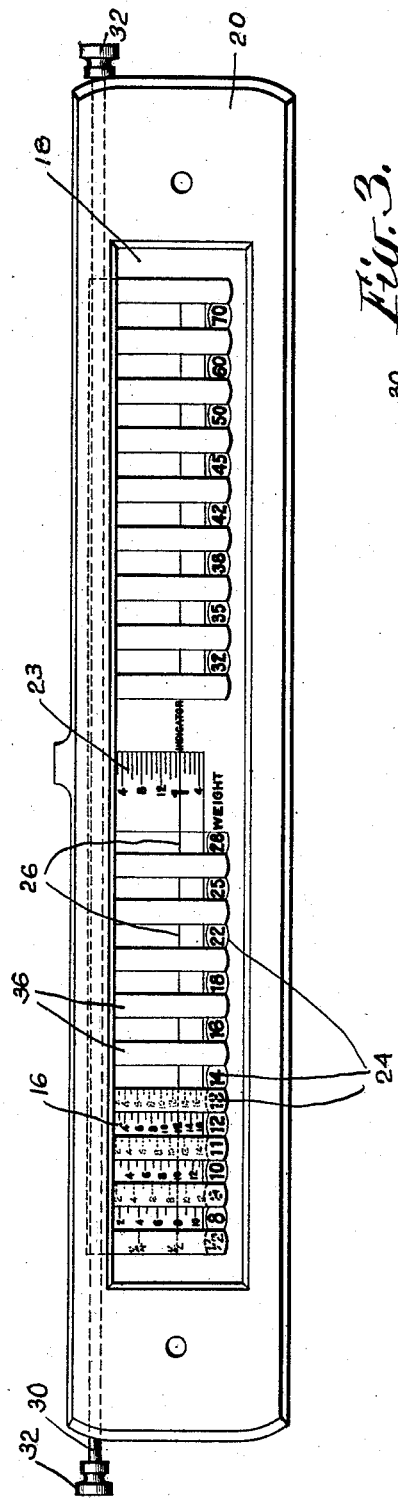
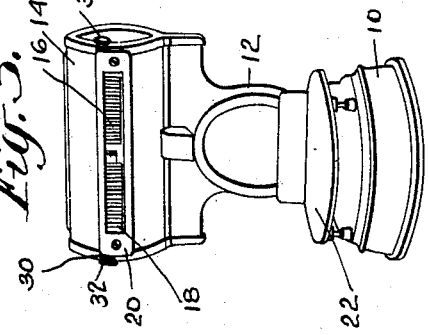
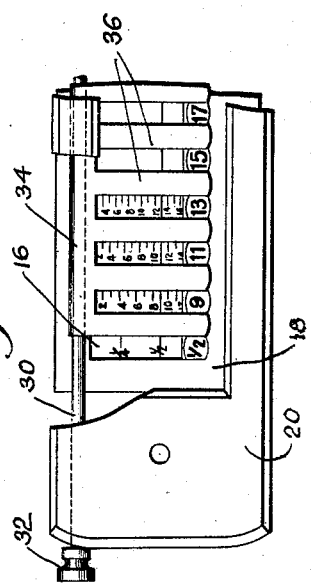
Inventor
James S. Ogsbury
Attorneys
Cooper, Kerr & Dunham Patented Aug. 12, 1930

1,772,464

UNITED STATES PATENT OFFICE

JAMES S. OGSBURY, OF TORONTO, ONTARIO, CANADA, ASSIGNOR TO DAYTON SCALE COMPANY, OF DAYTON, OHIO, A CORPORATION OF NEW JERSEY

COMPUTING SCALE

Application filed September 26, 1925. Serial No. 58,713.

This invention pertains to weighing scales, more particularly scales of the automatic computing type.

These scales generally have a chart comprising parallel, closely adjacent columns or rows of figures. Each column is associated with a particular number representing a price per pound or other unit of weight, and the figures in each column are the money values of different weights of goods calculated at the price corresponding to that column or row of values.

In some types of these scales the chart is stationary and an index actuated by the lever system of the scale moves relatively to the chart. In other types of computing scales the price chart, or price "range" as it is known in the trade, is stationary and the value chart actuated by the lever system moves relatively to the price range.

In using either type of scale the operator after placing the goods on the scale platform and waiting for the movable scale parts to come to rest, in order to learn the value of the goods, must first find on the price range the price per pound of the goods and then, with his eye, follow along the column or row of computed values and read the particular value pointed out by the indicator.

The indicator is generally a wire extending across all the value columns or rows, and is generally in fixed relationship to the price range. If the price range is stationary the indicator is also stationary, while if the price range is movable the indicator generally moves with it.

In any case, in determining a value, the operator must first select the proper price on the price range and then follow the corresponding value column or row until the correct value will be found where the indicator wire crosses that particular column.

The columns or rows of values are closely packed with figures, especially those columns corresponding to high prices, and every column is closely similar to the adjacent columns on both sides of it, so it happens that the gaze of the operator in moving from price range to indicator sometimes wanders from the proper column into an adjacent column, and an incorrect value is read.

This is particularly true in recent years because of the practice of placing more prices in the price range thereby making the value columns not only more numerous but narrower and therefore more difficult to read.

This invention provides means for concealing or covering the prices and value columns immediately adjacent and on both sides of the price and value which are being read by the operator, thereby removing all temptation for the eye of the operator to wander to the adjacent columns and making it easy for him to confine his gaze to the proper column, thus eliminating possibility of error.

Another object of my invention is to relieve the strain on the eyes of the operator which may become very trying when using the scale constantly.

I am for purposes of illustration showing my invention in connection with a drum type of computing scale, but as stated above, it may be used with other types of scales and the invention extends to such use.

In the drawings,

Fig. 1 shows a portion of a drum computing scale with my invention in place.

Fig. 2 is an enlarged view, partly broken away, showing details of my device.

Fig. 3 is a perspective view of a drum type computing scale of well known make.

In Fig. 3, 10 is the base frame of the scale containing the lever system, 12 is the vertical housing containing some of the automatic load offsetting devices, while 14 is the outer shell in which is mounted for rotation the drum chart 16 which may be seen through the opening 18 in the guard 20.

When the goods to be weighed are placed on platform 22, the lever system and load offsetting devices are displaced an amount proportionate to the weight of the goods, with the result that the drum chart 16, connected to the lever system, is rotated and comes to rest at a new position which indicates the weight of the goods and the value thereof at any price on the price range.

As shown in Fig. 1 the central portion of chart 16 is devoted, as at 23, to showing the weight of the goods on the platform, while the balance of the chart is devoted to the display of computed values. 24 is the price range and 26 the indicator, both being fixed in position. The chart 16 moves relatively to indicator and price range and is shown in the position it assumes when a one pound load is on platform 22. It will be understood that chart 16 bears a column of values corresponding to each price on the price range but the drawings show only a few of the value columns (Figs. 1 and 2).

To learn the value of the load on the platform at any price the operator locates that price on the price range and then runs his eye up the value column to the indicator where will be found the computed value of that particular load of goods at that particular price per pound.

My invention comprises the rod 30 slidably mounted in the frame of the scale just above the reading opening 18. A knob 32 is provided on each end of rod 30 for convenience of the operator. Attached to rod 30 is the comb shaped member 34 having a plurality of downwardly projecting teeth or fingers 36. Each finger 36 is the same width as a value column on the chart, and the fingers are so spaced apart as to provide an opening the width of a chart column between each pair of fingers. The length of rod 30 between knobs 32 is longer than frame 20 by an amount equal to the width of a chart column and member 34 is so set on rod 30 that when rod 30 is in its extreme left hand position, as in Fig. 1, with right hand knob 32 against frame 20, then the first finger 36 (counting from the left) covers the first column of values and its corresponding price designation, the second finger 36 covers the third value column and its price, and so on across the chart, every second column and price being covered, every alternate column and price being open. This is shown in Fig. 1, in which the ½, 9, 11 and 13 columns are concealed, while 8, 10, 12, etc., are exposed. In Fig. 2, rod 30 has been pushed to the right and the set of columns and prices concealed in Fig. 1 are exposed, while those exposed in Fig. 1 are now concealed.

From the above description the operation of the invention will be clear. The operator simply pushes rod 30 to the right or left to expose the price designation and value column he wants and when that has been done the adjoining value columns and prices on both sides of those he is using will be covered, thus preventing him from making mistakes by reading figures from the wrong column.

What I claim is:

1. A device for facilitating the reading of a scale chart, comprising a casing having an elongated opening, a rod slidably carried by said casing for movement longitudinally of said opening, a plurality of spaced fingers rigid with said rod for covering alternate portions of said opening, each finger extending entirely across the width of the opening, and manually manipulable means on said rod extending outside the casing whereby the rod may be shifted for causing said fingers to obscure different alternate portions of said opening.

2. A device for facilitating the reading of a scale chart, comprising a casing having an elongated opening, a rod slidably carried by said casing for movement longitudinally of said opening, a plurality of spaced fingers rigid with said rod for covering alternate portions of said opening, each finger extending entirely across the width of said opening and overlapping a portion of the exterior of the casing adjacent said opening, and means for sliding said rod to cause said fingers to cover different alternate portions of the opening.

3. A device for facilitating the reading of a chart having adjacent columns of indicia, comprising a casing having an elongated opening through which said indicia may be viewed, a plurality of rigidly joined fingers, carried by said casing and movable in a direction longitudinal of the opening, each finger extending entirely across said opening, adjacent fingers covering alternate columns of indicia, and manually manipulable means for moving said fingers to cause adjacent fingers to cover different alternate columns of indicia.

4. A device such as described in claim 3, in which the casing adjacent the opening has indicia in line with the columns of indicia on the chart, characterized by the fact that said fingers overlap the indicia-bearing portion of said casing.

In testimony whereof I hereto affix my signature.

JAMES S. OGSBURY.